250-201 PF  AU 252  EX
FIP8212    XR   4,133,606

United States Patent [19]
Hosoe et al.

[11] 4,133,606
[45] Jan. 9, 1979

[54] METHOD AND SYSTEM FOR DETECTING SHARPNESS OF AN OBJECT IMAGE

[75] Inventors: Kazuya Hosoe, Machida; Tsuyoshi Asaeda, Sagamihara; Hideo Yokota, Tokyo; Tamotsu Shingu, Zushi, all of Japan

[73] Assignee: Canon Kabushiki Kaisha, Tokyo, Japan

[21] Appl. No.: 631,133

[22] Filed: Nov. 11, 1975

[30] Foreign Application Priority Data

Nov. 13, 1974 [JP] Japan ................................ 49/130635

[51] Int. Cl.$^2$ ............................................. G03B 3/00
[52] U.S. Cl. ......................................... 354/25; 250/201
[58] Field of Search ............. 354/25; 250/201, 209; 318/640

[56] References Cited
U.S. PATENT DOCUMENTS 3,896,304  7/1975  Aoki et al. ............................... 354/25

OTHER PUBLICATIONS

"The Measurement of Power Spectra", Blackman and Tukey, Dover, 1958, pp. 25-26.
"Easy to Use Computer Control System for Small Processes", Control Engineering, p. 27, Apr. 1973.

*Primary Examiner*—Russell E. Adams
*Attorney, Agent, or Firm*—Toren, McGeady and Stanger

[57] ABSTRACT

The present invention relates to a method and a system for detecting the sharpness of the object image by detecting the amount of the component of a certain specified frequency, whereby the object image formed by means of an image forming optical system is detected by an image sensitive element consisting of a number of fine photo sensitive elements arranged respectively integrated on one plane, while the outputs of the above mentioned photo sensitive elements are delivered out one after another in accordance with the arrangement order of the above mentioned elements by means of a signal time series means so as to carry out an electrical scanning of the above mentioned object image in such a manner that the then obtained scanning outputs of the object image are successively converted by means of an A - D (analogue-digital) converting means into digital signals which are put in a small computer in which an estimation function for estimating the amount of the component of a certain specified frequency in the spectrum of the spacial frequencies of the object light beam forming the above mentioned object image is programmed in advance.

4 Claims, 15 Drawing Figures

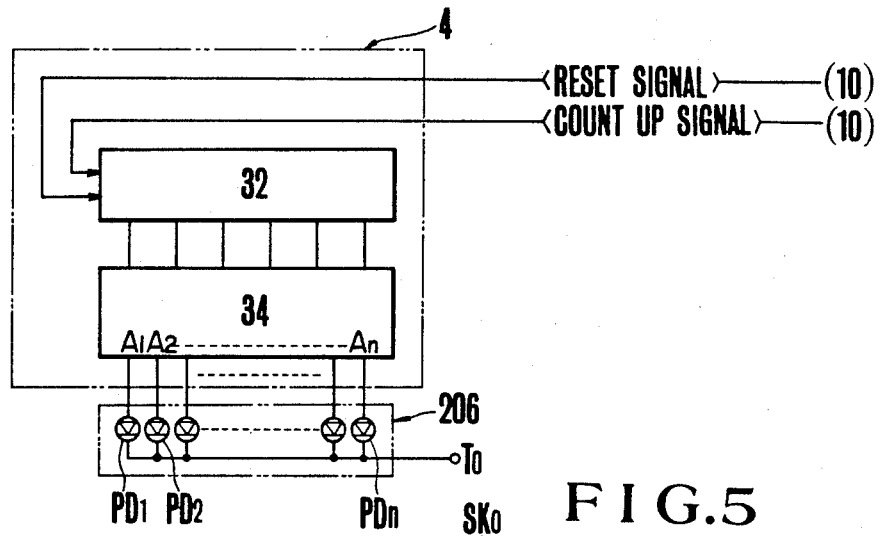
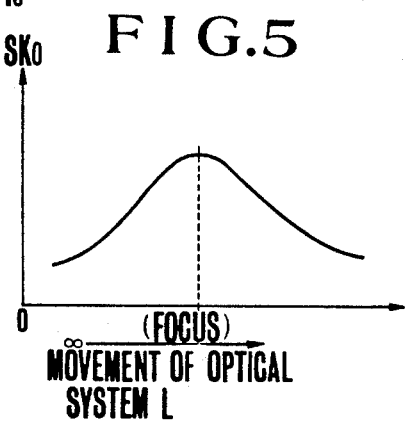
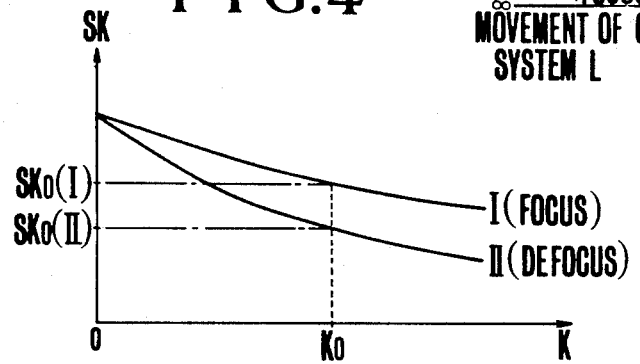

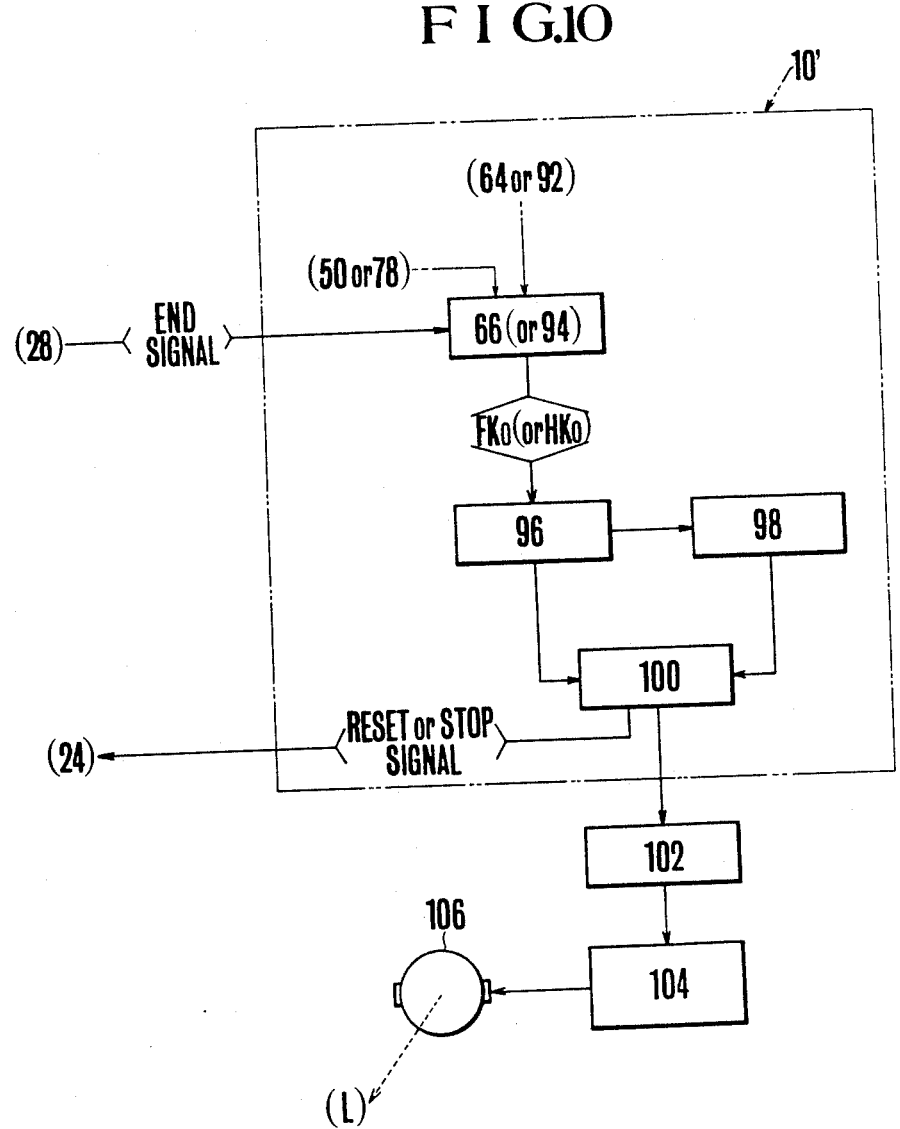

METHOD AND SYSTEM FOR DETECTING SHARPNESS OF AN OBJECT IMAGE

BACKGROUND OF THE INVENTION

1. Field of the Invention

The present invention relates to a method and a system for detecting the sharpness of the object image particularly suited for the application in the automatic focus detecting device of the optical system of the optical instrument such as camera and so on.

2. Description of the Prior Art

In case of an optical instrument such as camera, a remarkably large weight is laid on the method for detecting the sharpness of the object image formed by means of the optical system in order to realize the so called active automatic focus adjusting device by means of which the focusing of the optical system is automatically carried out by photoelectrically detecting the variation of the sharpness of the object image formed by means of the image forming optical system. In other words, the focusing accuracy of the optical system depends largely upon the detecting accuracy of the sharpness of the object image.

Being connected with the active automatic focus adjusting device for the optical instruments such as camera, various kinds of methods respectively device for detecting the sharpness of the object image have so far been proposed, whereby such methods respectively devices as have been proposed for example in U.S. Pat. No. 3,511,155 (granted to Yamada) or U.S. Pat. No. 3,713,371 (granted to Kurihara et al) are theoretically believed to be able to detect the sharpness of the image with comparatively high accuracy.

For example, U.S. Pat. No. 3,511,155 proposes a device for detecting the shaprness of the object image for the automatic focus detecting device for camera, whereby a photosensitive surface of the photo-conductive cell arranged on the scheduled focus plane of the image forming optical system is divided by a number of electrodes into a number of tape-shaped portions in a certain determined direction in such a manner that the portions are formed as fine independent light amount sensitive part so as to compose a number of bridge circuits with these sensitive parts, and a rotary disc with slits is provided immediately in front of this photo cell in such a manner that by means of the rotation of this rotary disc the image plane of the object image formed by the above mentioned optical system is scanned in the same direction as that of the tape-shaped portions in the sensitive surface of the photo-cell in such a manner that the unbalanced outputs of the above mentioned bridge circuits are summarized and taken out as the scanning output of the image plane so as to detect the sharpness of the object image.

Further, U.S. Pat. No. 3,713,371 proposes a focus detecting device for camera, whereby a number of fine sensing elements presenting a pair of p-n solar cells connected in parallel and in opposite polar orientation arranged in order on one plane so as to compose a spacial frequency sensor on which sensor the object image is formed by means of the optical system and the output differences taking place between two cells in the sensing elements in accordance with the degree of the sharpness of the object image are summarized so as to detect the sharpness of the object image.

Beside the above, another focus detecting device is further proposed, whereby on the focus plane a plural number of fine portions with proper area are provided in such a manner that the light on the portions when the object image is formed on the focus plate by means of the image forming optical system is led to the corresponding photo-electric transducing elements by the optical fibers so as to be converted into electrical signals, and the absolute values or the squared values of the output differences between pairs of photo-electric transducing elements corresponding to sets of two adjacent portions are obtained and summarized so as to detect the degree of the sharpness of the object image formed by the above mentioned optical system by detecting the amount of the summarized value.

However, in case of the device for example by U.S. Pat. No. 3,511,155, the object image formed by means of the image forming optical system is dynamically scanned by means of a mechanical scanning means such as slits at the scheduled image forming position, so that the automatic focus adjusting device in accordance with such method as is proposed by U.S. Pat. No. 3,511,155 is complicated and large whereby there still remain many problems to be solved before the device is used for small optical instruments such as camera.

Such kind of devices as mentioned above, namely such devices as detect the sharpness of the object image photo-electrically so as to carry out the automatic focus adjustment of the optical system, different in their composition and effect though they are, in principle obtain the information output corresponding to the sharpness of the object image by converting the distribution of the intensity of illumination on the plane of the object image formed with the light beam from the object into electrical signal and processing the signal accordingly, whereby in case of the conventional devices signals are processed in an analogue way so that not only the process of a series of informations is complicated and can not be carried out quickly but also the outputs of circuits always float due to the variation of the ambient temperature with the result that the detection result with high accuracy can not be obtained and therefore, it is remarkably difficult to always carry out a superior focus adjustment of the optical system, which is very inconvenient.

In order to eliminate such difficulties of conventional devices, further another automatic focus adjusting device has been proposed, whereby by utilizing a gray scale device the elements of the object image formed by the optical system is measured so as to obtain the contrast information of the object image in a digital way and the then measured values are processed in accordance with a certain determined function so as to obtain the final adjustment values for focusing the optical system.

However, in case of a method for measuring the image contrast by the gray scale the measurement accuracy is decreased especially for the image pattern with low contrast in such a manner that there is a certain determined limit for the final response efficiency at the time of the automatic adjustment of the optical system, which is also inconvenient.

On the other hand, the inventors, in order to eliminate such inconveniences as mentioned above of the conventional devices, have proposed a focus detecting system with U.S. patent application Ser. No. 563,462 (Title "A System for Exposure Measurement and/or Focus Detection by Means of Image Sensor", corresponding German Patent Application No. 25 14 2307), whereby by means of an image sensor consisting a number of fine light sensing elements arranged respectively integrated the image pattern of the object image formed by the image forming optical system is electrically scanned, and the then obtained outputs of the light sensing elements are converted into digital values so as to carry out the focus detection for the scheduled image forming plane of the above mentioned optical system.

In case of a prefered embodiment of the focus detecting system propose above, an image sensor consisting of a number of fine arranged or integrated light sensing elements is provided at the image forming position of the image forming optical system or at a position equivalent to the image forming position in such a manner that the outputs of the light sensing elements in the image sensor are successively converted into digital values in the order of arrangement while the absolute values of the differences between the digital values of the adjacent light sensing elements are successively integrated and summarized, whereby the focus is detected when the total sum of the absolute values of the differences of the above mentioned digital values during the movement of the above mentioned optical system reaches maximum.

Namely, in case of the proposed system the degree of the contrast of the object image is estimated so as to detect the sharpness of the object image by summarizing the differences of the contrasts between fine picture elements (object image elements) in the image pattern of the object image formed by means of the image forming optical system over the whole range of the image pattern.

However in case of the proposed system in which such a method as detects the degree of the sharpness of the object image by directly estimating the distribution of the intensity of illumination on the image plane is adopted, there is a problem in the method how to estimate the outputs converted into digital values, of the light sensing elements with the result that there is a limit for the final detection accuracy of the system while at the same time there is a limit for the image patterns to which the system responses efficiently, whereby especially for the image patterns with low contract the responsiveness is so decreased that the system can not always be adopted as automatic focus detecting system for optical instruments such as camera, which is inconvenient.

SUMMARY OF THE INVENTION

The principal purpose of the present invention relating to a further improvement of the proposal made by the Ser. No. 563,462 is to offer an improved method and an improved system for detecting the sharpness of the object image, eliminating all of the above mentioned shortcomings of the above proposed focus detecting system.

In order to fulfil the above mentioned purpose, the present invention has adopted as basic principle for detection the fact that the degree of the sharpness of the object image corresponds to the amount of the component of a certain specified frequency in the spectrum of the spacial frequencies of the image light beam forming the object image.

A nother purpose of the present invention is to offer a novel method and a novel system for finally detecting the sharpness of the object image, by processing the scanning outputs converted into digital values in accordance with an estimation function for estimating the amount of the component of the specified frequency in the spectrum of the spacial frequencies of the image beam light forming the object image so as to detect the amount of the component of the above mentioned specified frequency.

Connected with this purpose in case of embodiments of the present invention a small electronic computer is provided for processing the above mentioned scanning outputs converted into digital values whereby an estimation function for estimating the amount of the component of the specified frequency in the spectrum of the spacial frequencies in the image light beam forming the object image is programed in this small electronic computer in advance. Hereby this small electronic computer, when supplied with the scanning outputs converted into digital value, carries out the operation in accordance with the function programed in advance so as to estimate the amount of the component of the above mentioned specified frequency.

In accordance with a preferred embodiment of the present invention it is proposed to adopt the Fourier transformation function as the above mentioned estimation function. Namely, the Fourier transformation function is the one to represent the spectrum of the spacial frequencies of the image light beam forming the object image, whereby when the sharpness of the object image is low the electrical signal due to the photoelectrical outputs of the light sensing elements in the image sensor does not contain so much higher harmonic components nor so much abrupt changes so that the spectrum of the higher harmonics in the Fourier transformation becomes small. When on the other hand, the sharpness of the object image is high, the electrical signal due to the outputs of the above mentioned light sensing elements contains much higher harmonic component and abrupt changes so that the spectrum of the higher harmonics of the above mentioned Fourier transformation. Consequently when the magnitude of the spectrum of a certain specified frequency is taken in notice, the higher the sharpness of the object image is, the larger the magnitude of the spectrum is.

When, thus, the scanning outputs by means of the image sensor is processed by a small electronic computer in accordance with the Fourier transformation function, the output of this small electronic computer can be assumed as the value corresponding to the sharpness of the object image.

In accordance with further another embodiment of the present invention it is proposed to adopt the Walsh-Hadamard transformation function as the above mentioned estimation function. Similarly to the Fourier transformation function, the Walsh-Hadamard transformation function is suited for representing the spectrum of the spacial frequencies of the image light beam forming the object image, whereby when the spectrum of a certain specified frequency is taken into notice, the higher the sharpness of the object image is the larger the magnitude of this spectrum is in the same way as in case of the spectrum of the Fourier transformation. Consequently by means of the Walsh-Hadamard transformation function it is possible to detect the sharpness of the object image in the same way as by means of the Fourier transformation function.

Further another purpose of the present invention is to offer a focus detecting device or an automatic focus adjusting device suited for optical instruments such as camera, by making use of the method in accordance with the present invention.

Further other purposes and features of the present invention will be disclosed out of the following explanations made in accordance with the accompanying drawings of the embodiment of the present invention.

BRIEF DESCRIPTION OF THE DRAWINGS

Below the present invention will be explained in accordance with the preferred embodiment shown in the accompanying drawings.

FIG. 2A shows an embodiment of the area type image sensor consisting of a number of photosensitive elements presenting a fine area and being arranged in shape of matrix.

FIG. 2B shows an embodiment of the line type image sensor consisting of photo-conductive elements as photo-sensitive elements.

FIG. 2C shows an embodiment of the line type image sensor consisting of photo-diodes as photo-sensitive elements.

FIG. 2D shows an embodiment of the line type image sensor consisting of photo-voltaic elements as photo-sensitive elements.

FIGS. 3A–3C respectively show a block diagram of the composition of the signal time series device 4 shown in FIG. 1; whereby FIG. 3A shows an embodiment of the basic composition of the time series device suitable for the present invention.

FIG. 3B shows an embodiment of the time series device suitable for the area type image sensor 202 shown in FIG. 2A.

FIG. 3C shows an embodiment of the time series device suitable for the line type image sensors 204, 206 and 208 shown in FIGS. 2B–2D, particularly for the line type image sensor 206 shown in FIG. 2C.

FIG. 4 shows a diagram for showing the relation between the spectrum distribution of the spacial frequency of the image light beam for forming the object image.

FIG. 5 shows a diagram for showing the variation of the estimated value SKo of a specific frequency Ko in the spectrum distribution of the above mentioned frequency due to the translation of the optical system L.

FIG. 10 shows a block diagram for showing the basic composition of the important parts in case the automatic focus adjusting system for the image forming optical system L is composed with the object image sharpness detecting system shown in FIGS. 7–9.

DETAILED DESCRIPTION OF THE PREFERRED EMBODIMENTS

A t first the object image sharpness detecting method in accordance with the present invention will be explained as follows.

(1) Firstly, the object image formed by means of the image forming optical system is received by the image sensor consisting of a number of the fine photo-sensitive elements arranged or integrated on a plane, while the outputs of the above mentioned photo-sensitive elements are delivered one after another by means of the signal time series means in such a manner that the above mentioned object image is electrically scanned.

(2) Secondly, the then obtained scanning outputs of the object image are converted into digital signals one after another by means of an A-D converting means (Analoge-digital converter).

(3) Thirdly, the digital signals are put in the small electronic computer in which an estimation function is programmed in advance for estimating the amount of a specific frequency component in the spectrum of the spacial frequency of the object light beam for forming the above mentioned object image in such a manner that the amount of the above mentioned specific frequency component is estimated by operation.

(4) Lastly, the sharpness of the image formed by the optical system is estimated by means of the final output of the electronic computer.

Figure 1:
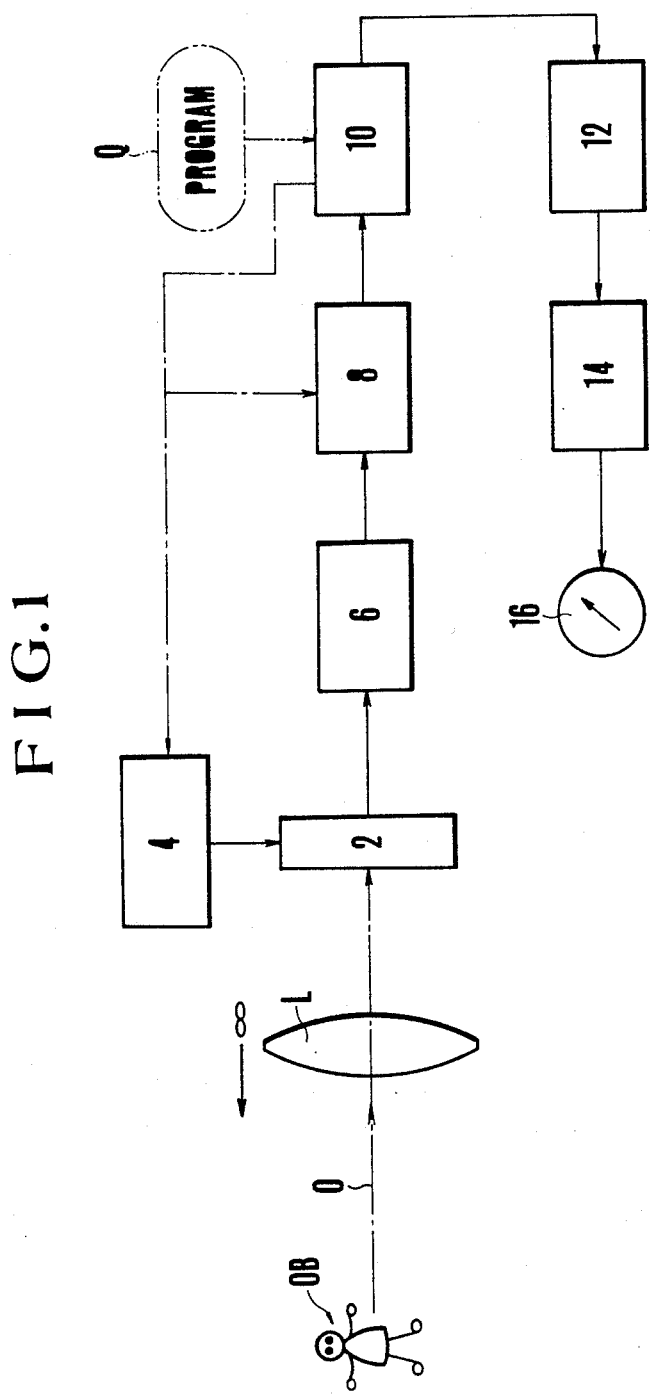
FIG. 1 shows a block diagram of the basic composition of the object sharpness detecting system for carrying out the method in accordance with the present invention.

FIG. 1 shows the basic composition of an embodiment of the system for carrying out the above mentioned method.

In the drawing, OB is the object the sharpness of whose sharpness is to be detected. L is the image forming optical system provided movably along the optical axis O, so as to form the image of the object at a certain determined position.

2 is the image sensor consisting a number of fine and independent photo-sensitive elements arranged or integrated on one plane, being arranged at the position at which the image is to be formed or in its neighborhood (an embodiment of the concrete composition of the image sensor 2 will be explained later in accordance with FIGS. 2A - 2D).

4 is the signal time series device for making a time series of the photoelectrical outputs of the elements in the above mentioned image sensor 2 by successively delivering the photoelectrical outputs of the elements in accordance with the order of the arrangement of the elements in such a manner that the object OB whose image is formed by the above mentioned optical system L is scanned by means of the effect of the time series device 4. (An embodiment of the composition of the time series device 4 will be explained later in accordance with FIGS. 3A–3C). Hereby the operation of the time series device 4 is controlled by the control signal produced by the computer 10 to be explained later.

6 is the amplifier for amplifying the photoelectric outputs successively delivered from the elements in the image sensor 2 by means of the above mentioned time series device 4, being connected to the output terminal of the image sensor 2. This amplifier 6 is intended to amplify the photoelectric outputs up to the proper level, because the photoelectric output is very weak for the intensity of the illumination on the light sensing plane of the image sensor 2 is as low as for example 10 lux. or less.

8 is the A-D (Analogue-Digital) converter for converting the outputs of the elements amplified by means of the amplifier 6 into digital values, whereby a conventional A-D converter can be used so that its detailed explanation will be omitted here. Hereby the operation of the converter 8 is controlled by the control signal produced by the computer 10 to be explained later. 10 is the small computer so programed as to operate the outputs of the element converted into digital values by means of the A - D converter 8 in accordance with a certain determined function in order to detect the sharpness of the image, whereby in the computer 10 a program Q of the estimation function is set for estimating the spectrum distribution of the spacial frequency of the image light beam for forming the image of the object. (The estimation function will be explained later in detail). 12 is the D-A (Digital-Analog) converter for converting the final operation output of the above mentioned computer 10 so as to facilitate the process, because the final operation output is digital signal. 14 is the meter control circuit for controlling the meter 16 so as to indicate the image sharpness in accordance with the final operation output of the computer 10 converted into analogue signal by means of the D-A converter 12.

The composition of the above mentioned image sensor 2 and the above mentioned signal time series device 4 will be explained in accordance with FIGS. 2A–2D and 3A–3C.

Figure 2A:
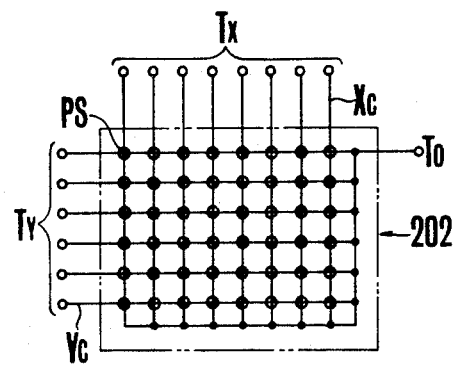
FIGS. 2A–2D respectively show the concrete composition of the image sensor 2 suited for the present invention; whereby
Figure 2B:
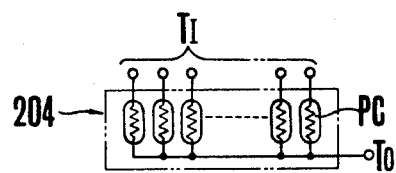
Figure 2C:
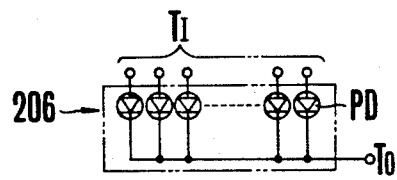
Figure 2D:
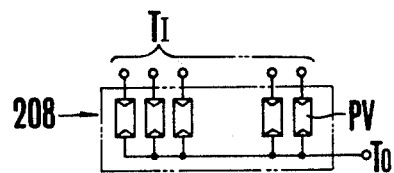

FIGS. 2A–2D respectively show a concrete embodiment of the image sensor 2. FIG. 2A shows an area type image sensor 202 consisting of a number of fine and independent photo-sensitive elements PS arranged in shape of matrix on one plane, whereby the elements PS are respectively connected to the crossing points of a certain determined number of the conductors Xc presenting Tx terminals and determining X axis with a certain determined number of the conductors Yc presenting Ty terminals and determining Y axis, being at the same time connected commonly to the output terminal To. Thus, when an optional terminal of the plural number of the terminals Tx and an optional terminal of the plural number of the terminal Ty are selected at the same time, the photoelectric output of only one photo-sensitive element PS connected to the terminals is produced at the output terminal To. FIGS. 2B–2D respectively show a line type image sensor so designed that the image sensor consists of a number of fine and independent photo-sensitive elements arranged on one plane whereby the one terminal of each element is commonly connected to the output terminal To in such a manner that the other terminal $T_1$ is selected, the photoelectric output of the element connected to the selected terminal is produced at the output terminal To. FIG. 2B shows a line type image sensor 204 in which photo-conductive elements PC are used as photo-sensitive elements, FIG. 2C a line type image sensor 206 in which photo-diodes PD are used as photo-sensitive elements and FIG. 2D a line type image sensor 208 in which photo-voltaic elements PV are used as photo-sensitive elements. Namely for the above mentioned image sensor 2, the conventional photo-diode array (MOS Image Sensor), CCD (Charge Coupled Device) and so on can be used.

Figure 3A:
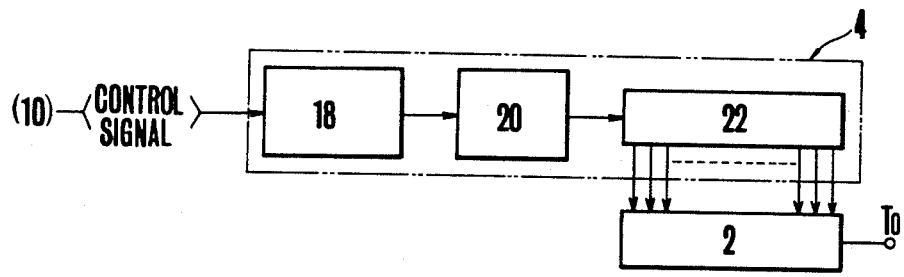
Figure 3B:
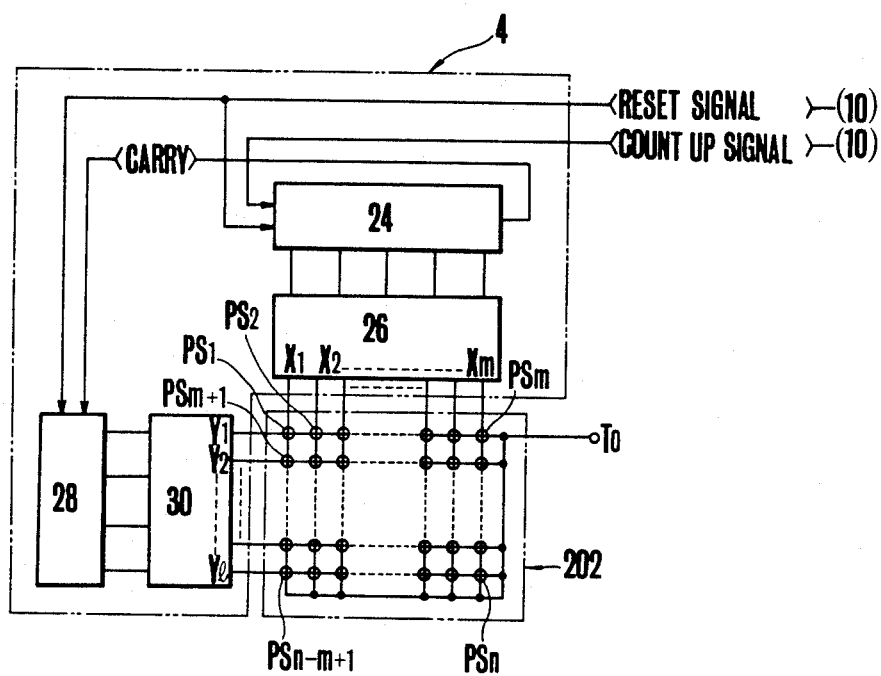

FIGS. 3A–3C respectively show an embodiment of the above mentioned time series device 4. FIG. 3A shows a basic composition of the time series device 4 suitable for the present invention, whereby 18 is the clock pulse generator for generating clock pulses with a certain determined frequency, its operation being controlled by means of the control signal produced by the above mentioned computer 10. 20 is the ring counter for counting the clock pulses produced by the pulse generator 18 so as to produce scanning pulses suited for making a time series of the photoelectric output of the elements in the above mentioned sensor 2. 22 is the driver for successively changing over the selected state of the element in the image sensor 2 in accordance with the scanning pulses produced by the ring counter 20.

When in the above mentioned composition clock pulses are produced by the clock pulse generator 18 in response to the control signal produced by the computer 10, the outputs of the elements in the image sensor 2 are delivered one by one from the output terminal To in accordance with the timing of the above mentioned clock pulses by means of the operation of the ring counter 20 and the pulse generator 18, so as to form a time series of the elements.

FIG. 3B shows a concrete composition of the time series device suited for the area type image sensor 202 shown in FIG. 2A.

In FIG. 3B, 24 is the X-address counter with a certain determined number of bits capable of responsing to the count up signal produced by the above mentioned computer 10.

26 is the X-address decoder connected to the X-address counter 24, presenting m X axis $X_1, X_2 \ldots X_m$ successively changed over by means of the count signal from the X-address counter 24. Hereby let the X-address counter 24 be the counter with 5-bits as shown in the drawing, m can be choosen including the reset state of the counter as follows $$m = 2^5 + 1 = 33.$$

28 is the Y-address counter with a certain number of bits capable of responding to the carry signal produced by the counter 24 when the above mentioned X-address counter 24 has counted up to m, 30 the Y-address decoder connected to the Y-address counter 28 presenting l Y axis $Y_1, Y_2 \ldots Y_l$ successively changed over by means of the count signal from the Y-address counter 28. Hereby let the Y-address counter 28 be the counter with 4 bits as shown in the drawing, l can be chosen including the reset state of the counter as follows $$l = 2^4 + 1 = 17.$$

The photo-sensitive elements PC in the above mentioned image sensor 202 are respectively arranged at $n(= m \times l)$ crossing points of the X-axis with Y-axis of the above mentioned both address decoder 26 and 30. When, therefore, the X-address counter 24 is composed as counter with 5 bits and the Y-address counter 28 as counter with 4 bits, the image sensor 202 can present $n\{= (2^5+1) + (2^4+1) = 561\}$ photo sensitive elements PC including the reset state of both counters 24 and 28.

Below the operation of the time series device 4 composed as mentioned above will be explained.

When the current source switch not shown in the drawing for operating the whole system is closed, the then signal is put in both address counters 24 and 28 as the reset signal from the computer 10, so as to reset these counters 24 and 28. In this state only the $Y_1$-axis in the Y-address decoder 30 and only the $X_1$-axis in the X-address decoder 26 are brought in the switched on state. Thus only the photoelectric output of the element $PC_1$ at the coordinate $(X_1, Y_1)$ in the image sensor 202 is delivered from the output terminal To. Then the count up signal is produced by the computer 10 and the X-address counter 24 responses to the signal, when by means of the count signal from the counter 24 the $X_1$-axis is brought out of the switched on state into the switched off state and the $X_2$-axis is brought out of the switched off state into the switched on state in the X-address decoder 26 in such a manner that the output of the element $PS_2$ at the coordinate $(X_2, Y_1)$ is delivered from the output terminal To. When the X-axis of the X-address decoder 26 are successively changed over until the output of the element $PS_m$ at the coordinate $(X_m, Y_1)$ is delivered and the count up signal is delivered from the computer 10, the X-address counter 24 delivers a carry signal to the Y-address counter 28. When the Y-address counter 28 responses to this carry signal, by means of the count signal from the counter 28 the $Y_1$ axis is brought out of the switched on state into the switched off state and $Y_2$ axis is brought out of the switched off state into the switched on state in the Y-address decoder 30. On the other hand, in the X-address decoder 26 by means of the count signal of the above mentioned X-address decoder 24, $X_m$-axis is brought out of the switched on state into the switched off state and $X_1$-axis is brought out of the switched off state into the switched on state. In this way, the output of the element $PS_{m+1}$ at the coordinate $(X_1, Y_2)$ is delivered from the output terminal To.

According as in this way the X-axis and the Y-axis of both address decoders 26 and 28 are successively changed over, the outputs of n photo-sensitive elements PS from the element $PS_1$ at the coordinate $(X_1, Y_1)$ to the element $PS_n$ at the coordinate $(X_m, Y_l)$ are selectively delivered out. When the output of the last element $PS_n$ is delivered out, the computer 10 delivers the reset signal to both counters 24 and 28 so as to reset both counters 24 and 28 in such a manner that the delivery of the output is started from the element $PS_1$.

FIG. 3C shows a concrete composition of the time series device suited for the line type image sensors 204, 206 and 208 shown in FIGS. 2B-2D. Hereby the case the device is applied for the image sensor 206 shown in FIG. 2C is shown. In FIG. 3C, 32 is the address counter capable of responsing to the count up signal produced by the computer 10, 34 the address decoder connected to the address counter 32 presenting n axis $A_1, A_2 \ldots A_n$ successively changed over by means of the count signal from the address counter 32, whereby the selective terminals $T_1$ of n photo-diodes PD in the above mentioned image sensor 206 are connected to the axis $A_1, A_2 \ldots A_n$.

When the address counter 32 is the counter with 6-bits as is shown in the drawing, n becomes as follows including the reset state of the counter $$n = 2^6 + 1 = 65.$$

Namely, the image sensor 206 can present maximum 65 photo-diodes PD. When in the above mentioned composition the reset signal is put in the address counter 32 at the operation start of the system as mentioned above, the counter 32 is reset, when the only the first axis $A_1$ in the address decoder 34 is brought in the switched on state in such a manner that the output of the first photo-diode $PD_1$ in the image sensor 206, being connected to the axis $A_1$ is delivered from the output terminal To.

When then the address counter 32 responses to the count up signal produced by the computer 10, by means of the then count signal of the counter 32 the first axis $A_1$ is brought out of the switched on state into the switched off state and the second axis $A_2$ is brought out of the switched off state into the switched on state in the address counter 34. Thus the output of the second diode $PD_2$ connected to the second axis $A_2$ is delivered from the output terminal To.

According as in this way the axis $A_1, A_2 \ldots A_n$ of the address counter 34 are successively changed over, the outputs of the photo-diodes PD are selectively delivered out from the first photo-diode $PD_1$ to the n-th photo-diode $PD_n$.

When the output of the n-th photo-diode $PD_n$ has been delivered out the computer 10 delivers the reset signal to the address counter 32 so as to reset the counter 32 in such a manner that the output of the first photo-diode $PD_1$ starts to be delivered out from the beginning.

Below the operation of the system shown in FIG. 1 will be explained, taking the explanations made in accordance with FIGS. 2A-2D and 3A-3C into consideration. When a current source switch not shown in the drawing for operating the system is closed in the focussed state of the object by the image forming optical system L, the then signal is put in the time series device 4 as the reset signal from the computer 10 so as to reset the time series device 4 in such a manner that as is explained in accordance with FIGS. 3B and 3C the photoelectric output of the first element in the image sensor 2 is delivered, amplified upto a certain determined level by means of the amplifier 6 and then put in the A - D converter 8, so as to be converted into digital value. When the digital conversion has been completed by means of the A-D converter 8, the digital information held by the A - D converter 8 is put in the computer 10, so as to start the operation in accordance with a certain determined estimation frequency set by the program Q, delivering at the same time the count up signal to the time series device 4 and the A-D converter 8.

Thus the A-D converter 8 is reset at the state capable of digital conversion of a new analogue signal, while the time series device 4 is in a position to deliver the output of the second element in the image sensor 2 in response to the count up signal. The output of the second element delivered out by means of the time series device 4 is amplified by the amplifier 6 and then converted into digital value in the same way as the case with the first element.

In the meantime, the computer 10 carries out a certain determined operation of the output from the first element. As soon as the computer 10 finishes the operation of the output from the first element, the digital information of the output of the second element, stored in the A - D converter is put in the computer 10, which starts the operation in the same way as the case with the output of the first element, at the same time delivering the count up signal to the time series device 4 and the A - D converter 8.

When, the above mentioned process being repeated, the scanning of the image plane of the object image and the determined operation of all the element in the image sensor 2 are completed, the computer 10 further carries out the determined operation in accordance with the program Q so as to obtain the spectrum distribution of the spacial function of the image light beam forming the object image in accordance with the outputs of all these elements. After the completion of this operation, the final operation information is put in the D - A converter 12 in accordance with the program Q.

The D - A converter converts the digital signal as the final operation output of the computer 10 into the analogue signal which is put in the meter control circuit 14. In accordance with the output from the D - A converter 12 the meter control circuit 14 controls the meter 16 so as to indicate the sharpness of the then object image correctly.

According as the optical system L is moved, as is shown in FIG. 1, along the direction of the arrow in the drawing from the position corresponding to the infinite distance, the scanning of different image planes of the object image is carried out in the scheduled image forming plane of the optical system L whereby at each scanning the sharpness information of the object OB in the above mentioned scheduled image forming plane is finally indicated by the meter 16.

When, therefore, the position at which the meter 16 indicates the maximum sharpness is obtained, the optical system L being moved, and the optical system L is set at the obtained position, the sharpness of the object image in the then scheduled image forming plane is maximum, which means that the object OB is correctly focussed by the optical system L.

Below the function program Q set in the computer 10 will be explained.

As explained above, the method in accordance with the present invention is based upon the theory that the degree of the sharpness of the image corresponds to the amount of a certain specified frequency component when the specified frequency is detected in the spectrum of the spacial frequencies of the image light beam forming the object image, whereby the relation between the spectrum distribution of the spacial frequencies of the image light beam forming the object image and the sharpness of the object image is shown in FIG. 4 in an outlined way.

In FIG. 4, the abscissa shows the spacial frequency K of the image light beam forming the above mentioned object image while the ordinate shows the value SK calculated by the estimation function programed in the above mentioned computer 10.

The spectrum distribution of the spacial frequency of the above mentioned image light beam in case the object OB is correctly focussed by the optical system L and that in case the object OB is not correctly focussed are shown by the curves I and II in FIG. 4.

Namely in case the object OB is correctly focussed by the optical system L the sharpness of the object image in the scheduled image forming plane of the optical system is high so that the higher harmonic component in the spectrum of the spacial frequency is increased, presenting the distribution shown by I, while in case the object OB is not correctly focussed by the optical system L the sharpness of the object image in the scheduled image forming plane of the optical system is low so that the higher harmonic component in the spectrum of the spacial frequency is decreased, presenting the distribution shown by II.

When the calculated values SKo of a specified frequency Ko are obtained for the distribution curves I and II, it is clear, as is shown in FIG. 4, that SKo (I) is larger than SKo (II) (SKo (I) > SKo (II)), from which it is understood that according as the sharpness of the image in the scheduled image forming plane of the optical system L increases, the component of the specified frequency Ko in the spectrum distribution of the above mentioned spacial frequency is increased. The variation of SKo during the movement of the optical system L at this time is as is shown in FIG. 5.

As the functions suited for obtaining the spectrum distribution of the above mentioned spacial frequency of the image light beam, for example, the Fourier transformation function or the Walsh-Hadamard function can be pointed out. Their explanations will be given below.

Let the digital conversion values of the photo-electric outputs of the photo-sensitive elements in the image sensor 2 be Pj ($j = 1, 2, \ldots n$, whereby n is the total number of the photo-sensitive elements in the image sensor 2), the Fourier conversion value Fk is represented as follows.

$$Fk = \sum_{j=1}^{n} Pj \cdot \exp\{-i\frac{2\pi jk}{n}\} / \sum_{j=1}^{n} Pj \qquad (i)$$

$$= \{\sum_{j=1}^{n} Pj \cdot \cos\frac{2\pi jk}{n} + i \sum_{j=1}^{n} Pj \cdot \sin\frac{2\pi jk}{n}\} / \sum_{j=1}^{n} Pj$$

Hereby the absolute value |Fk| of Fk is calculated as follows.

$$|Fk| = \frac{\sqrt{(\sum_{j=1}^{n} Pj \cdot \cos\frac{2\pi jk}{n})^2 + (\sum_{j=1}^{n} Pj \cdot \sin\frac{2\pi jk}{n})^2}}{\sum_{j=1}^{n} Pj} \qquad (ii)$$

Thus when the frequency of the frequency component to be estimated in the spectrum distribution of the spacial frequency is determined as Ko in advance, it is sufficient to obtain Fko in order to detect the sharpness of the object image as follows $$Fko = \{(\sum_{j=1}^{n} Pj \cdot \cos\frac{2\pi jk}{n})^2 + (\sum_{j=1}^{n} Pj \cdot \sin\frac{2\pi jk}{n})^2\} / \sum_{j=1}^{n} Pj \qquad (iii)$$

The absolute value Hk of the Walsh-Hadamard conversion value |Hk| is represented as follows in the same way.

$$|Hk| = \frac{\sqrt{\{\sum_{j=1}^{n} Pj \cdot Wc(k,j)\}^2 + \{\sum_{j=1}^{n} Pj \cdot Ws(k,j)\}^2}}{\sum_{j=1}^{n} Pj} \qquad (iv)$$

Figure 6:
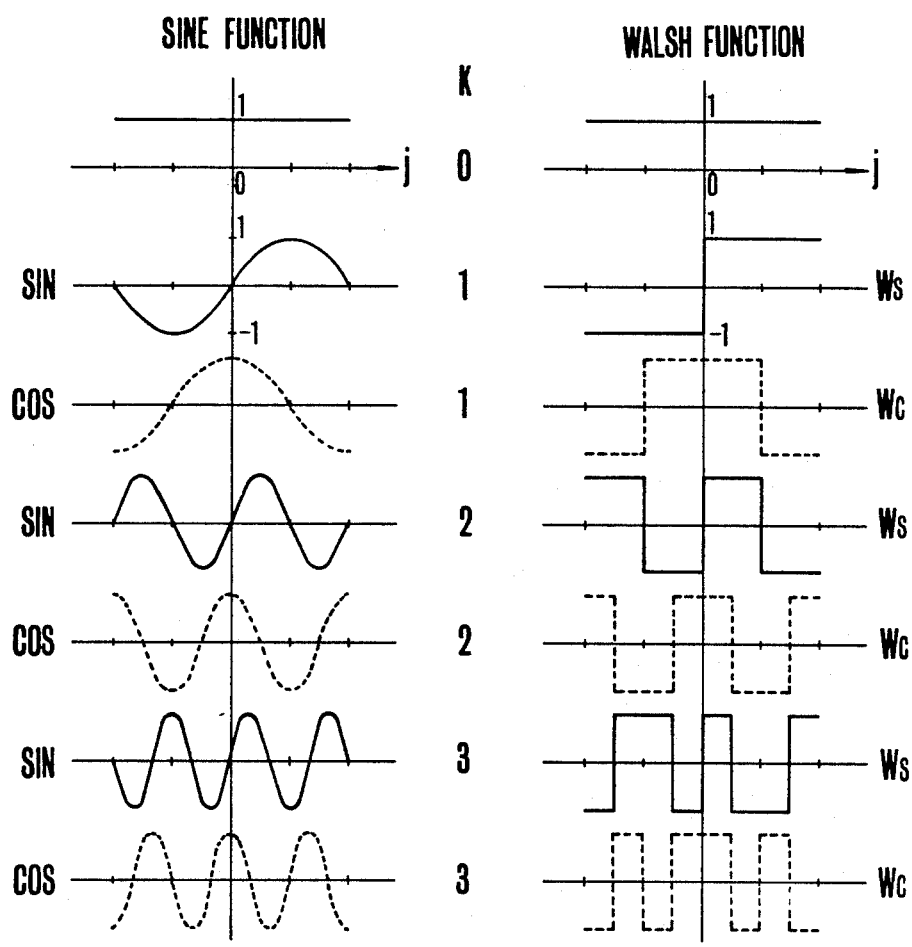
FIG. 6 shows a diagram for showing the relation between the sine function and the Walsh function.

Hereby Wc(k, j) and Ws (k, j) represent the Walsh function, and the relation between the Walsh function and the sine function are as shown in FIG. 6.

Thus when the frequency of the frequency component to be estimated is determined as Ko in the spectrum distribution of the spacial frequency in advance, it is sufficient to obtain Hko in order to detect the sharpness of the object image as follows.

$$Hko = [\{\sum_{j=1}^{n} Pj \cdot Wc(ko,j)\}^2 + \{\sum_{j=1}^{n} Pj \cdot Ws(ko,j)\}^2] / \sum_{j=1}^{n} Pj \quad (v)$$

Below the system in case the Fourier transformation represented by the equation (iii) or the Walsh-Hadamard transformation represented by the equation (v) is applied in order to estimate the component of the specified frequency Ko in the spectrum distribution of the above mentioned spacial frequency will be explained in accordance with the embodiments shown in FIGS. 7-9.

Figure 7:
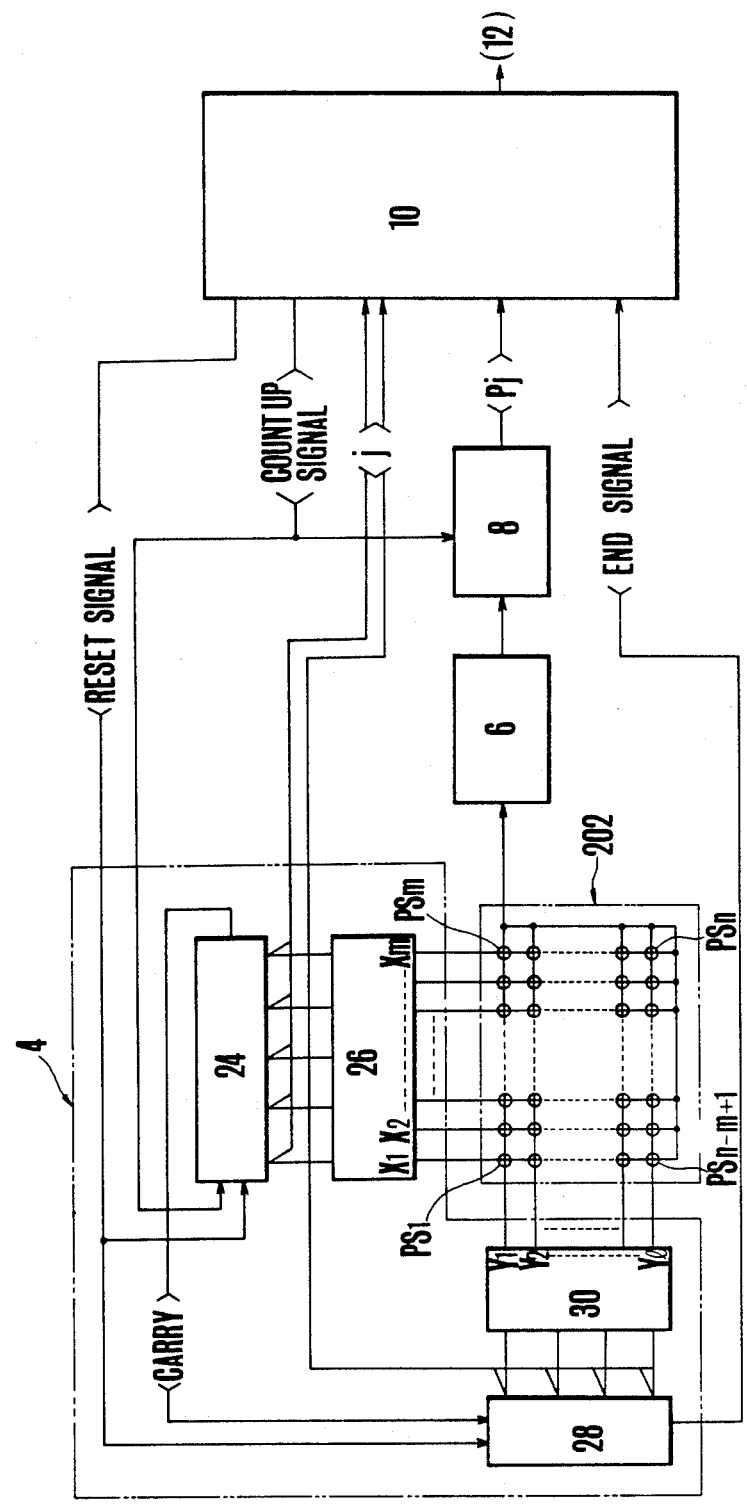
FIG. 7 shows a block diagram for showing the basic composition of important part and the signal transmitting-receiving relation at each part in case the area type image sensor 202 shown in FIG. 2A is applied in order to carry out the method in accordance with the present invention.

FIG. 7 shows the composition of the important parts especially from the image sensor 2 to the computer 10 of the system and the signal transmitting and receiving situation among the blocks in case the Fourier transformation (iii) or the Walsh-Hadamard transformation (v) is applied as the estimation function. The composition of the important parts of the shown system can be applied either for the equation (iii) or for the equation (v).

Figure 8:
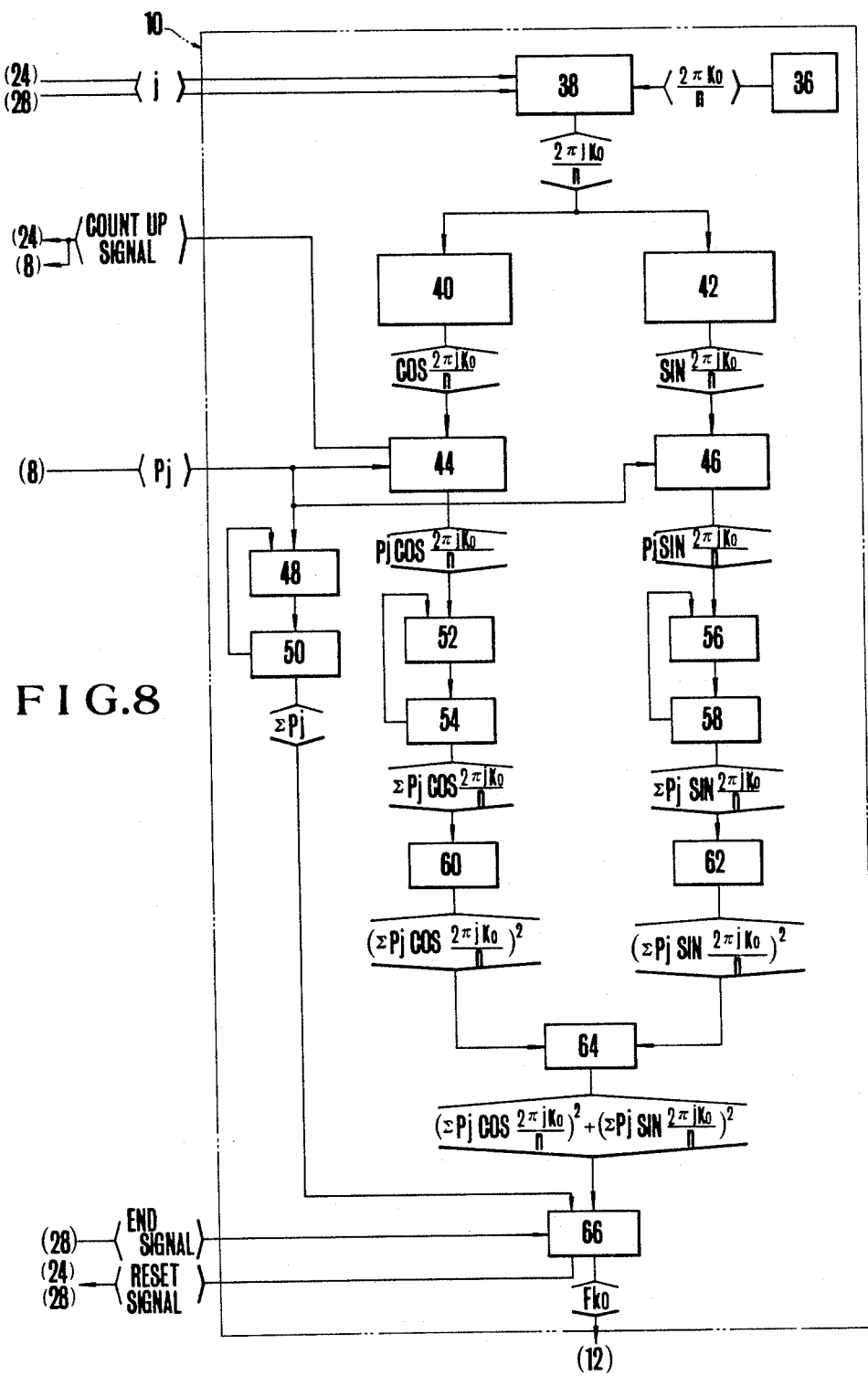
FIG. 8 shows a block diagram for showing the content and the development of the operation by the computer 10 shown in FIG. 7 in case the Fourier transformation function is adopted as the function for estimating the spectrum distribution of the spacial frequency of the image light beam forming the above mentioned object image.
Figure 9:
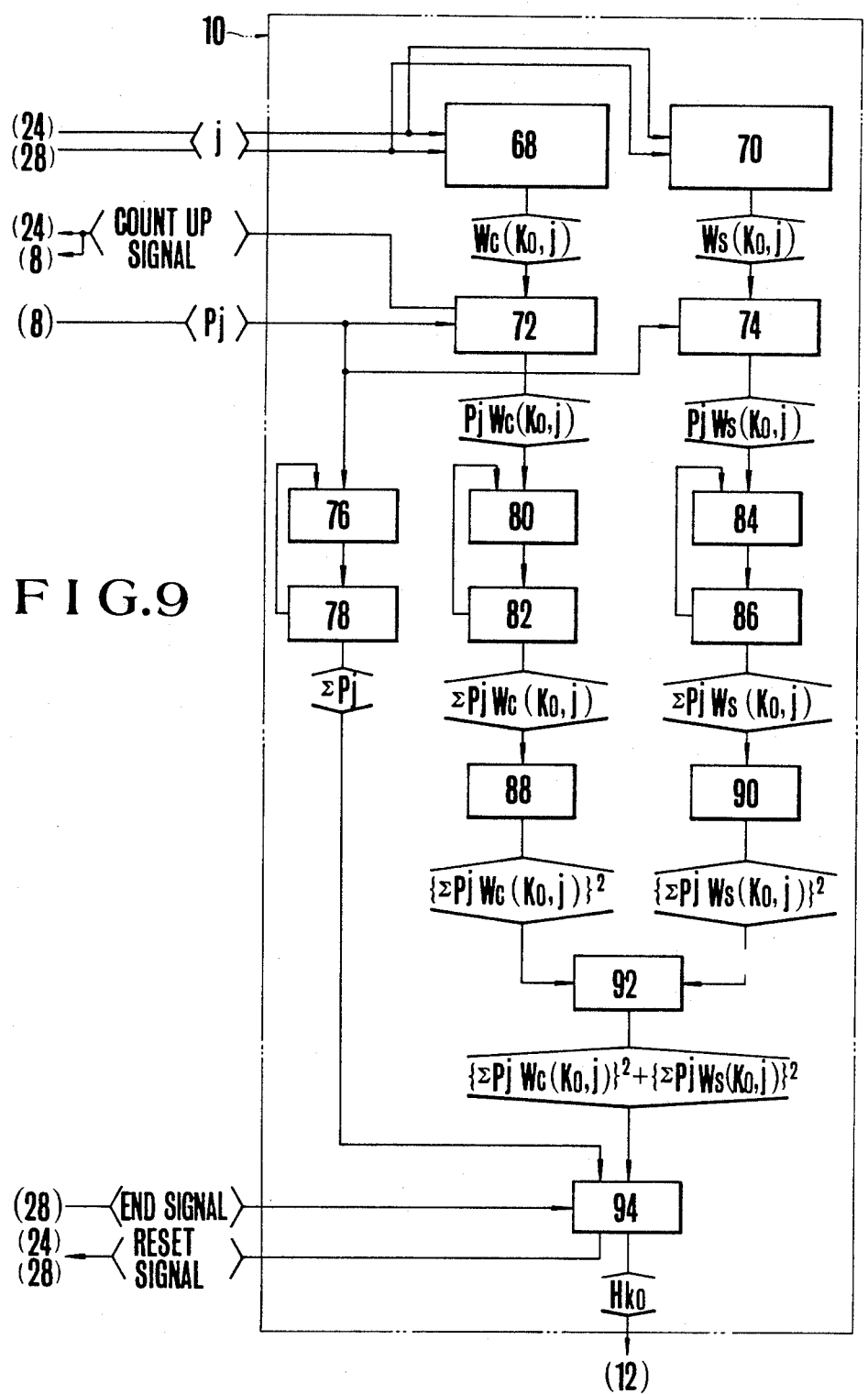
FIG. 9 shows a block diagram for showing the content and the development of the operation by the computer 10 shown in FIG. 7 in case the Walsh-Hadamard transformation function is adopted as the function for estimating the spectrum distribution of the spacial frequency of the image light beam forming the above mentioned object image.

FIG. 8 shows the content and the development of the operation by means of the computer 10 in case the Fourier transformation (iii) is applied, while FIG. 9 shows the content and the development of the operation by means of the computer 10 in case the Walsh-Hadamard transformation (v) is applied.

Below the important parts from the image sensor 2 to the computer 10 will be explained in accordance with FIG. 7. In the system shown in the drawing the area type image sensor 202 shown in FIG. 2A is adopted as image sensor 2 so that as time series device 4 what is composed as shown in FIG. 3B is adopted. The elements shown in FIG. 7 and presenting the same figures as those shown in FIG. 1. 2A and 2B are the same elements so that the explanation of their composition and effect is omitted so far as it is not inconvenient for the understanding of the present invention.

When in FIG. 7 the reset signal is put in both address counters 24 and 28 so as to reset these counters 24 and 28 in such a manner that, as explained above, the output of the photosensitive element $PS_1$ at the coordinate $(X_1, Y_1)$ in the image sensor 202 is delivered out, whereby at the same time the address signal $j=1$ of the element $PS_1$ is produced by both counters 24 and 28 and put in the computer 10.

When the output of the element $PS_1$ has been converted into digital value by the A - D converter 8, the digitally converted value $P_1$ of the output of the element $PS_1$ is put in the computer 10 from the A - D converter 8, whereby at the same time the computer 10 delivered the count up signal to the X-address counter 24 and the A-D converter 8. The computer 10 in which the address signal $j=1$ of the above mentioned element $PS_1$ and the digital conversion value $P_1$ of the output of the element $PS_1$ are put start the determined operation for obtaining the above mentioned function conversion value Fko (equation (iii)) or Hko (equation (v)).

The above mentioned process is carried out from the element $PS_1$ at the coordinate $(X_1, Y_1)$ to the element $PS_n$ at the coordinate $(X_m, Y_l)$ in the image sensor 202, whereby at the time point at which the element $PS_n$ at the coordinate $(X_m, Y_l)$ is pointed out by the address decoders 26 and 30, the Y-address counter 28 delivers to the computer 10 the end signal that the scanning of the determined image plane of the object image has been completed.

When this end signal is put in the computer 10, the computer further carries out the final operation in accordance with the operation result of the elements $PS_1$ - $PS_n$, so as to obtain Fko or Hko. Hereby the computer 10 further produces the reset signal for the address counters 24 and 28.

Below the content and the development of the operation of the computer 10 in case the Fourier transformation (equation (iii)) is adopted will be explained in accordance with FIG. 8, taking the above mentioned explanation into consideration.

In FIG. 8, 36 is the constant setting circuit for setting the constant: $(2\pi ko/n)$, 38 the multiplier for operating $(2\pi jko/n)$ in accordance with the output $(2\pi ko/n)$ of the constant setting circuit 36 and the address signal j produced by the address counters 24 and 28, of the photo-sensitive elements in the image sensor 202, 40 and 42 the ROM (Read Only Memory) devices for producing respectively cos $(2\pi jko/n)$ and sin $(2\pi jko/n)$ in accordance with the output of the multiplier 38.

44 is the multiplier for operating Pj·cos$(2\pi jko/n)$ in accordance with the output cos$(2\pi jko/n)$ of the ROM device 40 and the output Pj of the A-D converter 8, whereby when the output Pj of the A-D converter 8 in put in the multiplier 44, the multiplier 44 delivers the count up signal to the X-address counter 24 and the A - D converter 8.

46 is the multiplier for operating Pj·sin$(2\pi jko/n)$ in accordance with the output sin$2\pi jko/n)$ of the ROM device 42 and the output Pj of the A - D converter 8.

48 is the adder, 50 the register for registering the output of the adder 48, whereby the adder carries out the addition of the output Pj of the A - D converter 8 to the output of the register 50. Thus, when the scanning of the determined image plane of the object image has been completed, the final output of the register 50 is $$\sum_{j=1}^{n} Pj.$$

52 is the adder connected to the multiplier, 54 the register for registering the output of the adder 52 which carries out the output of the register 54 to the output Pj·cos$(2\pi jko/n)$ of the multiplier. Therefore, when the scanning has been completed, the register 54 produces the final output $$\sum_{j=1}^{n} Pj \cdot \cos \frac{2\pi jko}{n}.$$

56 is the adder connected to the multiplier 46, 58 the register for registering the output of the adder 56 which carries out the addition of the output Pj·sin$(2\pi jko/n)$ of the multiplier 46 to the output of the register 58. Therefore, the final output of the register 58 when the scanning has been completed, is $$\sum_{j=1}^{n} Pj \cdot \sin \frac{2\pi jko}{n}.$$

60 is the square device for operating $$(\sum_{j=1}^{n} Pj \cdot \cos \frac{2\pi jko}{n})^2$$

in accordance with the output of the register 54, 62 the square device for operating $$(\sum_{j=1}^{n} Pj \cdot \sin \frac{2\pi jko}{n})^2,$$

64 the adder for operating $$(\sum_{j=1}^{n} Pj \cdot \cos \frac{2\pi jko}{n})^2 + (\sum_{j=1}^{n} Pj \cdot \sin \frac{2\pi jko}{n})^2$$

in accordance with the outputs of both square devices 60 and 62. 66 is the divider for dividing the output of the adder 64 by the final output $$\sum_{j=1}^{n} Pj$$

of the register 50 is response to the end signal produced by the Y-address counter 28 when the scanning has been completed, whereby the output of the divider 66 is Fko represented by the equation (iii). Hereby the divider 66 delivers the reset signal to both address counters 24 and 28 when the operation of this Fko has been completed.

Below the development of the operation by the computer 10 during the operation of the system will be explained. When the system starts to operate and both address counters 24 and 28 produce the address signal $j=1$ of the first photosensitive element $PS_1$ in the image sensor, the multiplier 38 produces ($2\pi ko/n$) in accordance with the output of the constant setting circuit 36 and this address signal $j=1$ whereby the ROM devices 40 and 46 respectively deliver cos($2\pi ko/n$) and sin($2\pi ko/n$) to the multipliers 44 and 46 in accordance with the output of this multiplier 38.

When then the digital conversion of the output of the element $PS_1$ by means of the A - D converter 8 (the digital conversion value at this time is $P_1$) has been completed, this digital value $P_1$ is put in the multipliers 44 and 46 which respectively operate $P_1 \cdot \cos(2\pi ko/n)$ and $P_1 \cdot \sin(2\pi ko/n)$ and deliver them respectively to the adders 52 and 56. When, hereby, the digital value $P_1$ is put in the multiplier 44, the multiplier 44 delivers the count up signal to the X-address counter 24 and the A - D converter 8 so as to start the operation of the second element $PS_2$.

When the output of the second element $PS_2$ has been operated in the same way as mentioned above,, the then outputs of the multipliers 44 and 46 are respectively $P_2 \cdot \cos(4\pi ko/n)$ and $P_2 \cdot \sin(4\pi ko/n)$ which are respectively put in the adders 52 and 56 so as to be added to the operation results of the output of the first element $PS_1$. Therefore, the values then registered in the registers 54 and 58 are respectively $$(P_1 \cdot \cos \frac{2\pi ko}{n} + P_2 \cdot \cos \frac{4\pi ko}{n}) \text{ and}$$

$$(P_1 \cdot \sin \frac{2\pi ko}{n} + P_2 \cdot \sin \frac{4\pi ko}{n}).$$

When the above mentioned operation has been completed up to the output of the n-th element $PS_n$, the final output of the registers 54 and 58 are respectively $$\sum_{j=1}^{n} Pj \cdot \cos \frac{2\pi jko}{n} \text{ and } \sum_{j=1}^{n} Pj \cdot \sin \frac{2\pi jko}{n}$$

which are respectively put in the square devices 60 and 62 so as to be squared and then in the adder which produces $$(\sum_{j=1}^{n} Pj \cdot \cos \frac{2\pi jko}{n})^2 + (\sum_{j=1}^{n} Pj \cdot \sin \frac{2\pi jko}{n})^2.$$

Hereby the output of the register 50 at this time is $$\sum_{j=1}^{n} Pj.$$

When the scanning has been completed, the Y-address counter 28 produces the end signal. When the final operation by the adders 48 and 64 has been completed, the divider 66 divides the output of the adder 64 by the output of the register 50 so as to operate Fko in the equation (iii), delivering the reset signal to the address counters 24 and 28 when the operation of this Fko has been completed.

The output Fko of the divider 66 is converted into analogue signal by means of the D-A converter and then put in the meter control circuit 14 which controls the meter in accordance with the output of the A-D converter 12 so as to give a correct indication of the sharpness of the image.

Below the content and the development of the operation by the computer 10 in case the Walsh-Hadamard transformation (equation (v) ) is adopted will be explained in accordance with the equation 9.

In FIG. 9, 68 and 70 are the ROM devices producing respectively the Walsh functions Wc(ko,j) and Ws(ko,j) in accordance with the address signals j of the photosensitive elements in the image sensor 202, produced by the address counters 24 and 28.

72 is the multiplier for operating Pj·Wc(ko,j) in accordance with the output Wc(ko,j) of the NOD device 68 and the output Pj of the A-D converter 8, whereby the multiplier 72 delivers the count up signal to the X-address counter 24 and the A-D converter 8 when the output Pj of the A-D converter 8 is put in the multiplier 72.

74 is the multiplier for operating Pj·Ws(ko,j) in accordance with the output Pj of the A-D converter 8 and the output Ws(ko,j) of the ROM device 70.

76 is the adder, 78 the register for registering the outputs of the adder, whereby the adder 76 carries out the addition of the output Pj of the A-D converter 8 to the output of the register 78. When, therefore, the scanning of the determined image plane of the object image has been completed, the register 78 produces the final output $$\sum_{j=1}^{n} Pj.$$

80 is the adder connected to the multiplier, 82 the register for registering the outputs of the adder 80 which carries out the addition of the output Pj·Wc(ko,j)

of the multiplier 72 to the output of the register 82. Therefore, the final output of the register 82 when the scanning has been completed is $$\sum_{j=1}^{n} Pj \cdot Wc(ko,j).$$

84 is the adder connected to the multiplier 74, 86 the register for registering the output of the adder whereby the adder 84 carries out the addition of the output $Pj \cdot Ws(ko,j)$ of the multiplier 74 to the output of the register 86. Therefore, the final output of the register 86 is $$\sum_{j=1}^{n} Pj \cdot Ws(ko,j)$$

when the scanning has been completed.

88 is the square device for operating $$\{\sum_{j=1}^{n} Pj \cdot Wc(ko,j)\}^2$$

in accordance with the output of the register 82, while 90 is the square device for operating $$\{\sum_{j=1}^{n} Pj \cdot Ws(ko,j)\}^2$$

in accordance with the output of the register 86 and 92 is the adder for operating $$\{\sum_{j=1}^{n} Pj \cdot Wc(ko,j)\}^2 + \{\sum_{j=1}^{n} Pj \cdot Ws(ko,j)\}^2$$

in accordance with the output of the square devices 88 and 90.

94 is the divider for dividing the output of the adder 92 by the final output $$\sum_{j=1}^{n} Pj$$

of the register 78 in response to the end signal produced by the Y-address counter 28 when the scanning has been completed, whereby the output of the divider 94 is Hko represented by the equation (v). Hereby the divider 94 delivers the reset signal to the address counters 24 and 28 when the operation of Hko has been completed.

Below the development of the operation by the computer 10 during the operation of the system will be explained.

When the system starts to operate and the address counters 24 and 28 produce the address signal $j=1$ of the first photo-sensitive element $PS_1$ in the image sensor 202, the ROM devices 68 and 70 respectively deliver $Wc(ko,1)$ and $Ws(ko,1)$ to the multipliers 72 and 74.

When then the digital conversion of the output of the element $PS_1$ by means of the A-D converter 8 has been completed (the then digital conversion value is $P_1$), the digital value $P_1$ is put in the multipliers 72 and 74 which respectively operate $P_1 \cdot Wc(ko,1)$ and $P_1 \cdot Ws(ko,1)$ and deliver them to the adders 80 and 84. Hereby the multiplier 72 delivers the count up signal to the X-address counter 24 and the A - D converter 8 so as to start the operation of the second element when the digital value $P_1$ is put in the multiplier 72.

When the output of the second element $PS_2$ is operated in the same way as mentioned above, the then outputs of the multipliers 72 and 74 are respectively $P_2 \cdot Wc(ko, 2)$ and $P_2 \cdot Ws(ko, 2)$ which are respectively put in the adders 80 and 84 so as to be added to the operation result of the output of the first element $PS_1$. Therefore, the values then registered in the registers 82 and 86 are respectively $\{P_1 \cdot Wc(ko,1) + P_2 \cdot Wc(ko,2)\}$ and $\{P_1 \cdot Ws(ko, 1) + P_2 \cdot Ws(ko, 2)\}$.

When the above mentioned operation has been completed up to the output of the n-th element $PS_n$, the final outputs of the registers 82 and 86 are respectively $$\sum_{j=1}^{n} Pj \cdot Wc(ko,j)$$

and $$\sum_{j=1}^{n} Pj \cdot Ws(ko,j)$$

which are respectively put in the square device 88 and 90 so as to be squared and then in the adder 92 so as to operate $$\{\sum_{j=1}^{n} Pj \cdot Wc(ko,j)\}^2 + \{\sum_{j=1}^{n} Pj \cdot Ws(ko,j)\}^2.$$

The then output of the register 78 is $$\sum_{j=1}^{n} Pj.$$

When the scanning has been completed, the Y-address 28 produces the end signal. When the final operation by the adders 78 and 92 have been completed, the divider 94 divides the output of the adder 92 by the output of the register 48 so as to operate Hko represented by the equation (v), delivering the reset signal to the address counters 24 and 28 when the operation of this Hko has been completed. The output Hko of the divider 94 is converted into analogue signal by means of the D - A converter 12 and then put in the meter control circuit 14 which controls the meter in accordance with the output of the A - D converter 12 so as to give a correct indication of the sharpness of the object image.

Lastly an embodiment of the composition of the system for the automatic focus adjustment of the image forming optical systems L making use of the object image sharpness detecting systems shown in FIGS. 7-9 will be explained in accordance with FIG. 10.

FIG. 10 shows only the components to be added to the systems shown in FIGS. 7-9, of the automatic focus adjusting system making use of the object image sharpness detecting system shown in FIGS. 7-9, whereby as to the components not shown in the drawings those shown in FIGS. 7 and 8 or FIGS. 7 and 9 can be applied.

In FIG. 10, 10' is the computer, which is the computer 10 shown in FIGS. 8 or 9 further presenting the register 96 for registering the output of the divider 66 (or 94), the register 98 for registering the output of the register 96 and the comparater 100 for comparing the value registered by the register 96 with that registered by the register 98.

The above mentioned comparater 100 continues to produce a certain determined signal so far as "the value registered by the register 96" is larger than "the value registered by the register 98", comparing the outputs of the registers 96 and 98 with each other, and stops producing output immediately when "the value registered by the register 96" becomes smaller than "the value registered by the register 98". Namely, the comparator 100 detects the point of the inflexion (namely the point at which Sko becomes maximum) of the curve of Sko shown in FIG. 5.

102 is the D - A converter for converting the output of the comparator 100 into analogue signal, 104 the motor control circuit for controlling the motor for driving the optical system L in accordance with the output of the D - A converter 102.

The operation of the automatic focus adjusting system compo sed as mentioned above is as follows. When the system starts to operate the first scanning is carried out in the same way as mentioned above in accordance with FIGS. 7-9 whereby the divider 66 (or 94) produces Fko (or Hko) as explained above. Let the output of the divider 66 (or 94) at the first scanning be $[Fko]_1$ (or $[Hko]_1$). As soon as the output $[Fko]_1$ (or $[Hko]_1$) of the divider 66 (or 94) is immediately registered in the register 96, the comparator 100 starts to compare the value registered in the register 96 with that registered in the register 98.

At the first scanning the value registered in the register 98 is 0, while the value $[Fko]_1$ (or $[Hko]_1$) registered in the register 96 is larger than 0, namely "the value registered in the register 96" is larger than "the value registered in the register 98", so that the comparater 100 delivers the reset signal to the X-address counter 24 so as to start the second scanning, at the same time delivering a certain determined signal to the D - A converter 102. The output of the comparater, having been converted in the analogue signal by means of the D - A converter 102, is put in the motor control circuit 104, which operates the motor 106 in accordance with the output of the D - A converter 102. By the operation of this motor 106, the optical system L is moved along the direction of the arrow shown in FIG. 1 from the position corresponding to the infinite distance shown in FIG. 1.

When the divider 66 (or 94) has completed the determined operation for the second scanning (let the then operation result of the divider 66 (or 94) be $[Fko]_2$ (or $[Hko]_2$), the value $[Fko]_1$ (or $[Hko]_1$) registered in the register 96 becomes registered in the register 98, while in the register 96 the output $[Fko]_2$ (or $[Hko]_2$) of the divider 66 (or 94) for the second scanning becomes registered from the beginning. As soon as the new signal is registered in the register 96, the comparater 100 starts to compare the value register in the register 96 with that registered in the register 98 in the same way as mentioned above, namely in this case $[Fko]_2$ (or $[Hko]_2$) with $[Fko]_2$ (or $[Hko]_2$).

In case, hereby, $[Fko]_2$ or $[Hko]_2$) is larger than $[Fko]_1$ (or $[Hko]_1$), the comparater 100 delivers the reset signal to the X-address counter 24 in the same way as mentioned above so as to carry out the third scanning, at the same time delivering the determined signal to the D - A converter 102, so that the motor 106 continues to operate and the optical system L is moved, while in case $[Fko]_2$ (or $[Hko]_2$) is smaller than $[Fko]_1$ (or $[Hko]_1$), the output to the D - A converter 102 is immediately interrupted while the stop signal is delivered to the X-address counter 24 so as to stop the scanning.

As soon as the output of the comparater 100 is interrupted, the motor control circuit 104 stops the motor 106 so as to stop the movement of the optical system L. At this position, the correct forcussing of the object OB by the optical system is obtained.

In this way, the automatic focus adjustment of the optical system L is obtained.

As explained so far in accordance with the present invention the information as to the sharpness of the object image is obtained by estimating a specified frequency component in the spectrum of the spacial frequency of the image light beam forming the object image in accordance with a certain determined estimation function, whereby it is possible to remarkably improve the ratio of the signal to the noise by digitally processing the intensity of illumination at each point of the object image so as to obtain a correct information of the sharpness of the object image.

Namely, the Fourier transformation function or the Walsh-Hadamard function mentioned in the embodiments are the functions suited for estimating the spectrum of the spacial frequency of the light beam forming the object image, whereby in case the sharpness of the object image is low the electrical signal in accordance with the photoelectric output of the photo-sensitive elements in the image sensor does not present sufficient higher harmonics and is the signal with little abrupt variation so that the high frequency spectrum of the Fourier transformation or of the Walsh-Hadamard transformation is small, while in case the sharpness of the object image is high the signal in accordance with the output of the photo-sensitive elements is the signal presenting much higher harmonics and abrupt variation, so that the higher harmonics spectrum of the Fourier transformation or the Walsh-Hadamard transformation is large. When, therefore, the magnitude of the spectrum of a certain determined frequency is taken into notice, the magnitude of the spectrum becomes large according as the sharpness of the object image is increased. Thus, when the scanning output by means of the image sensor is operated by the computer in accordance with the Fourier transformation function or the Walsh-Hadamard transformation function, the output of the computer can be considered as the value corresponding to the sharpness of the object image.

Further, in case of the method in accordance with the present invention the sharpness of the object image is detected with remarkably high sensitivity through the above mentioned process of the information, whereby especially many information processes are carried out in digital signals so that, as is publicly known from the information theory the loss of the informations due to the noise is remarkably small as compared with the analogue process and therefore it is possible to sufficiently eliminate the problem of the ratio of the signal to the noise always taking place as the technical difficulties in case the electrical output obtained from the object with low intensity of illumination.

Further, in accordance with the present invention it becomes possible that the electronical computer could present a program suited for detecting the information of the sharpness of the object image with highest sensitivity, so that not only the detection of the sharpness of the object image with high sensitivity becomes possible but also various functions such as the pattern acknowledgement of simple shaped object, the detection of the video signal of the object image itself and its process and so on which are so far considered impossible becomes realizable in such a manner that in case of necessity the system could present even the system control function of the system camera prevailing at the present time.

What is claimed is:

1. An automatic focusing system comprising:
   (A) an image forming optical system having an optical axis and shiftable along the axis so as to form an object image on a predetermined imaging plane;
   (B) driving means operatively coupled with said optical system for shifting the optical system along the optical axis;
   (C) image sensing means comprising n photosensitive elements addressed differently from each other one plane, said sensing means being disposed at positions to receive the object image formed by the optical system on said imaging plane, said n-photosensitive elements serving for producing respective output signals corresponding to the light intensity impinging thereon;
   (D) scanning means for repeatedly scanning the object image on the imaging plane during the shifting of the optical system by said driving means and for sequentially sending out each analogue output of said n-photosensitive elements of said image sensing means in the order of each address of said n-photosensitive elements, said scanning means being electrically connected to each of said n-photosensitive elements;
   (E) A - D converting means to convert each analogue output of the n-photosensitive elements being sent out sequentially by said scanning means into a digital signal, said converting means being electrically connected to said image sensing means;
   (F) a processing device for consecutively taking each address signal of the n-photosensitive elements addressed in turn by said scanning means and the digital signals being produced by said A - D converting means and for evaluating the distribution of the specific spatial frequency spectrum in the image light beam forming the object image; on the basis of a Fourier-function; wherein said processing means includes:
   (F-1) a function value generating means to produce a sine-cosine function value of said specific spatial frequency on each address of the n-photosensitive elements, said generating means being electrically connected to said scanning means for producing the function value in response to each address signal;
   (F-2) multiplying means to calculate a product of said sine-cosine function value and the digitally converted value of the output of the photosensitive element at the address corresponding thereto; said multiplying means being electrically connected to said function value generation means and said A-D converting means;
   (F-3) first accumulating means to consecutively add the values calculated by said multiplying means cumulatively for calculating the total sum of said products on all of the n-photosensitive elements, said accumulating means being electrically connected to said multiplying means;
   (F-4) second accumulating means to consecutively add the digital signals being produced by said A-D converting means cumulatively for calculating the total sum of said digital signals on all of the n-photosensitive elements, said accumulating means being electrically connected to said A-D converting means;
   (F-5) dividing means to divide the value calculated by said first accumulating means by the value calculated by said second accumulating means, said dividing means being electrically connected to said first and second accumulating means;
   (F-6) first register means to record the value calculated by said dividing means as an l'th (l=1, 2, 3, . . .) scan is completed when the scanning of the object image is repeated several times during the shifting of the optical system by the driving means, said register means being electrically connected to said dividing means;
   (F-7) second register means to record the calculated value of said dividing means as an (l-1)th scan is completed when the scanning of the object image is repeated several times during the shifting of the optical system by the driving means, said second register means being electrically connected to said first register means and recording the value calculated by said dividing means as the (l-1)th scan on said first register means when l'th scan is completed; and
   (F-8) comparing means to judge which one of the value recorded by said first and second register means is larger than the other when each scan is completed, said comparing means being electrically connected to said first and second register means and producing a predetermined control signal when the values recorded by said registers become at least equal to each other; and
   (G) control circuit means to stop said driving means in response to said predetermined control signal produced by said comparing means, said circuit means being electrically connected to said driving means and said comparing means;
   so as to achieve automatic focusing of the image forming optical system on the object.

2. An automatic focusing system comprising:
   (A) an image forming optical system having an optical axis and shiftable along the axis so as to form an object image on a predetermined imaging plane;
   (B) driving means operatively coupled with said optical system for shifting the optical system along the optical axis;
   (C) image sensing means comprising n photosensitive elements on one plane and addressed differently, said sensing means being disposed at positions to receive the object image formed by the optical system on said imaging plane, said n-photosensitive elements respectively serving for producing analogue signals corresponding to the light intensity thereon;
   (D) scanning means for repeatedly scanning the object image on the imaging plane during the shifting of the optical system by said driving means and for sending out each analogue output of said n-photosensitive elements of said image sensing means in the order of each address of said n-photosensitive elements, said scanning means being electrically connected to each of said n-photosensitive elements;
   (E) A-D converting means to convert each analogue output of the n-photosensitive elements being sent out in time series by said scanning means into a digital signal, said converting means being electrically connected to said image sensing means;

(F) a processing device to consecutively taking each address signal of the n-photosensitive elements being addressed in turn by said scanning means and the digital signals being produced by said A-D converting means for evaluating the distribution of the specific spatial frequency spectrum in the image light beam forming the object image on the basis of a Walsh-function; said processing means including:

(F-1) function value generating means to produce a Walsh-function value of said specific spatial frequency on each address of the n-photosensitive elements, said generation means being electrically connected to said scanning means for producing the function value in response to each address signal;

(F-2) multiplying means to calculate a product of said Walsh function value and the digitally converted value of the output of the photosensitive element at the address corresponding thereto; said multiplying means being electrically connected to said function value generation means and said A-D converting means;

(F-3) first accumulating means to consecutively add the values calculated by said multiplying means cumulatively for calculating the total sum of said products or all of the n-photosensitive elements, said accumulating means being electrically connected to said multiplying means;

(F-4) second accumulating means to consecutively add the digital signals being produced from said A-D converting means cumulatively for calculating the total sum of said digital signals on all of the n-photosensitive elements, said accumulating means being electrically connected to said A-D converting means;

(F-5) dividing means to divide the value calculated by first accumulating means by the value calculated by said second accumulating means, said dividing means being electrically connected to said first and second accumulating means;

(F-6) first register means to record the calculated value by said dividing means as an l'th (l=1, 2, 3, . . .) scan is completed when the scanning of the object image is repeated several times during the shifting of the optical system by the driving means, said register means being electrically connected to said dividing means;

(F-7) second register means to record the calculated value of said dividing means as an (l-1)th scanning is completed when the scanning of the object image is repeated several times during the shifting of the optical system by the driving means, said register means being electrically connected to said first register means and recording the value calculated by said dividing means as the (l-1)th scan on said first register means when l'th scan is completed; and (F-8) comparing means to judge which one of the values recorded by said first and second register means is larger than the other when each scan is completed, said comparing means being electrically connected to said first and second register means and producing a predetermined control signal when the values recorded by said registers become at least equal to each other; and (G) a control circuit means to stop said driving means in response to said predetermined control signal from said comparing means, said circuit means being electrically connected to said driving means and said comparing means;

so as to achieve automatic focusing of the image forming optical system to the object.

3. An image sharpness detecting system for detecting the sharpness of an object image formed by an image forming optical system on a predetermined imaging plane, comprising:

(A) image sensing means comprising n-photosensitive elements addressed differently from each other on one plane, said sensing means being disposed at positions able to receive the object image formed by the optical system on said imaging plane, said n-photosensitive elements producing respective analog signals corresponding to light intensity;

(B) scanning means scanning the object image on the imaging plane by transmitting each analogue output of said n-photosensitive elements of said image sensing means in the order of each address of said n-photosensitive elements, said scanning means being electrically connected to each of said n-photosensitive elements;

(C) A-D converting means to convert each analog output of the n-photosensitive elements transmitted in time series by said scanning means into digital signal, said converting means being electrically connected to said image sensing means; and (D) a processing device for consecutively receiving each address signal of the n-photosensitive elements addressed in turn by said scanning means and the digital signals from said A-D converting means and for evaluating the distribution of the specific spatial frequency spectrum in the image light beam forming the object image on the basis of a Fourier function; said processing means including:

(D-1) function value generating means to produce a sine-cosine function value of the specific spatial frequency on each address of the n-photosensitive elements, said generating means being electrically connected to said scanning means for producing said function value in response to each of said address signals;

(D-2) multiplying means to calculate a product of said sine-cosine function value and the digitally converted value of the output of the photosensitive element at the address corresponding thereto; said multiplying means being electrically connected to said function value generation means and said A - D converting means;

(D-3) first accumulating means for consecutively and cumulatively adding the values calculated by said multiplying means to accumulate the total sum of said products on all of the n-photosensitive elements, said accumulating means being electrically connected to said multiplying means;

(D-4) second accumulating means to consecutively and cumulatively add the digital signals from said A-D converting means for calculating the total sum of said digital signals on all of the n-photosensitive elements, said accumulating means being electrically connected to said A-D converting means; and (D-5) dividing means to divide the value calculated by said first accumulating means by the value calculated by said second accumulating means, said dividing means being electrically connected to said first and second accumulating means and providing an electrical output representative of the sharpness of the object image formed by said image forming optical system on the imaging plane.

4. An image sharpness detecting system for detecting the sharpness of the object image formed by an image forming optical system on a predetermined imaging plane, comprising:

(A) image sensing means comprising n-photosensitive elements at positions and addresses different from each other on one plane, said sensing means being disposed at a position able to receive the object image formed by the optical system on said imaging plane, said n-photosensitive elements respectively, generating analog signals corresponding to light intensity;

(B) scanning means for scanning the object image on the imaging plane and supplying each analog signal from each of said n-photosensitive elements of said image sensing means in the order of each address of said n-photosensitive elements, said scanning means being electrically connected to each of said n-photosensitive elements:

(C) A-D converting means to convert each analog signal of the n-photosensitive elements being supplied sequentially by said scanning means into a digital signal, said converting means being electrically connected to said image sensing means;

(D) a processing device for consecutively processing each signal of the n-photosensitive elements being addressed in turn by said scanning means and converted by said A-D converting means and according to Walsh-function for evaluating the distribution of the specific spatial frequency spectrum in the image light beam forming the object image; said processing means including:

(D-1) function value generating means to supply a Walsh-function value of the specific spatial frequency on each address of the n-photosensitive elements, said generating means being electrically connected to said scanning means for supplying the function value in response to each address signal;

(D-2) multiplying means to calculate the product of said Walsh-function value and the digitally converted value of the output of the photosensitive element at the address corresponding thereto, said multiplying means being electrically connected to said function value generating means and said A-D converting means;

(D-4) second accumulating means to consecutively and cumulatively add the digital signals from said A-D converting means for calculating the total sum of said digital signals on all of the n-photosensitive elements, said accumulating means being electrically connected to said A-D converting means;

(D-5) dividing means to divide the value calculated by said first accumulating means by the value calculated by said second accumulating means, said dividing means being electrically connected to said first and second accumulating means and providing an electrical output representative of the sharpness of the object image formed by said image forming optical system of the imaging plane.

* * * * *